(12) United States Patent
Lillbacka

(10) Patent No.: US 6,374,966 B1
(45) Date of Patent: Apr. 23, 2002

(54) SHOCK ABSORBER ASSEMBLY

(75) Inventor: Jorma Lillbacka, Kauhava (FI)

(73) Assignee: Lillbacka Jetair Oy, Kauhava (FI)

( * ) Notice: Subject to any disclaimer, the term of this patent is extended or adjusted under 35 U.S.C. 154(b) by 0 days.

(21) Appl. No.: 09/449,527

(22) Filed: Nov. 29, 1999

Related U.S. Application Data

(63) Continuation-in-part of application No. 09/204,351, filed on Dec. 4, 1998, now abandoned.

(51) Int. Cl.$^7$ .............................................. F16D 57/00
(52) U.S. Cl. ....................... 188/266; 188/281; 188/315; 267/64.26
(58) Field of Search ................................ 188/266, 297, 188/314, 315, 281, 301, 322.13, 322.15; 267/64.13, 64.14, 64.15, 64.16, 64.26, 64.21, 64.24, 64.25, 64.28; 280/124.158, 124.157

(56) References Cited

U.S. PATENT DOCUMENTS

| | | | |
|---|---|---|---|
| 3,326,546 A | * 6/1967 | Otto ........................ | 267/64.11 |
| 3,378,110 A | * 4/1968 | Parrish, Jr. .................. | 188/315 |
| 3,447,644 A | 6/1969 | Duckett | |
| 4,647,026 A | * 3/1987 | Siemann et al. ......... | 267/64.15 |
| 5,996,978 A | * 12/1999 | Asanuma et al. ............. | 267/34 |
| 6,076,814 A | * 6/2000 | Grundei ...................... | 267/221 |

FOREIGN PATENT DOCUMENTS

| | | |
|---|---|---|
| DE | 1813407 | 6/1960 |
| EP | 0413420 | 2/1991 |
| FR | 1150431 | 1/1958 |

* cited by examiner

*Primary Examiner*—Pam Rodriguez
(74) *Attorney, Agent, or Firm*—Louis Woo

(57) ABSTRACT

The housing of a shock absorber is constructed to include an inner chamber surrounded by an outer chamber. The inner chamber is divided by the piston to which the piston rod is connected into two portions. One of these portion has a number of orifices that fluidly connect that portion to the outer chamber. A piston slidably and movably fitted along the length of the outer chamber divides the outer chamber into two compartments, one of which is in fluid communication with the portion of the inner chamber to which it is connected by means of the orifices. An incompressible fluid is provided in the fluidly interconnected compartment and portion. A biasing force acts against the piston in the outer chamber by means of a pressurized gas provided in the other compartment of the outer chamber. With the shock absorber thus constructed, when the piston rod moves, the piston to which it is connected would force an exchange of fluid between the inner chamber and the outer chamber, which acts as a reservoir. Both the size of the orifices and the pressure of the gas that acts against the piston in the outer chamber contribute to defining the stiffness of the shock absorber, i.e., how much dampening is to be effected to the movement of the piston rod relative to the housing. Another embodiment of the shock absorber partitions the outer chamber into three compartments, with the two end compartments being in fluid communication with the inner chamber. An alternative embodiment of the shock absorber is constructed with coacting pairs of plunger/bore and plunger/cavity for enhancing the damping effect of the shock absorber.

29 Claims, 5 Drawing Sheets

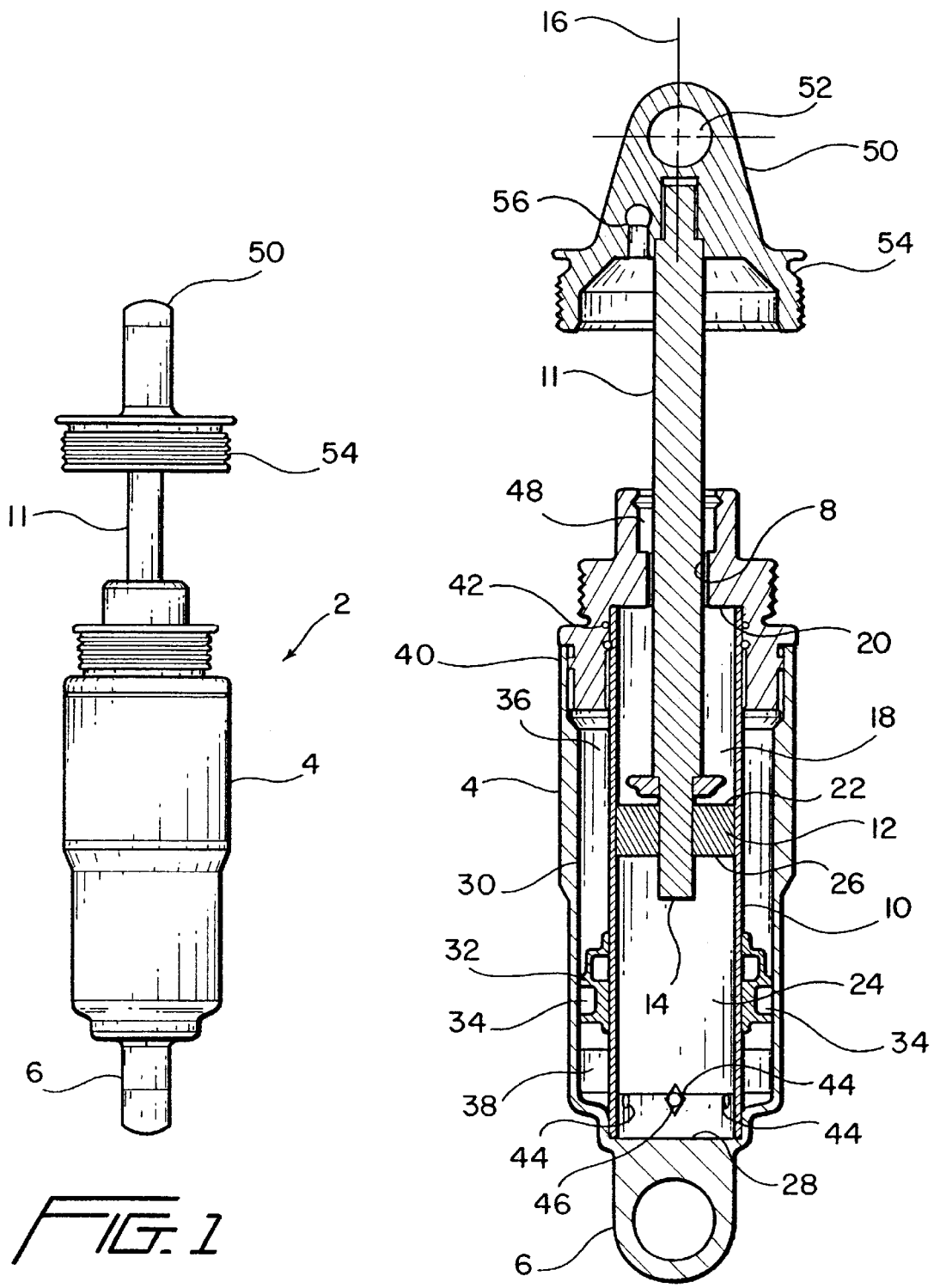

SHOCK ABSORBER ASSEMBLY

CROSS REFERENCE TO RELATED APPLICATION

This is a continuation-in-part of application Ser. No. 09/204,351 filed Dec. 4, 1998, now abandoned.

FIELD OF THE INVENTION

The present invention relates to shock absorbers and more particularly a shock absorber that utilizes different fluids for isolating or cushioning the ride of a vehicle to which the shock absorber is coupled.

BACKGROUND OF THE INVENTION

A suspension system for a vehicle typically includes the use of shock absorbers, shock absorbing struts and/or suspension springs to provide a cushioned ride for the driver and the passengers, if any, of the vehicle. A conventional shock absorber has a chamber filled with hydraulic oil in which a piston connected to a piston rod is moved. The viscosity of the oil in the cylinder provides damping for the movement of the piston rod relative to the cylinder so that any vibration or bump to either the cylinder or the piston rod that result from sudden jolts to the vehicle is modulated.

A second type of shock absorber consists of gas shocks that utilize pressurized gases for damping the movement of the piston rod. Yet a third type of suspension system comprises a combination of both oil and gas. For this type of suspension system, there is provided an external reservoir for the oil that is separate from the shock absorber cylinder. In this reservoir, there is stored, in addition to the oil, a pressurized gas that provides a biasing force against the oil so that, when oil is needed in the cylinder, the oil in the reservoir is forced by the pressurized gas to fill up the cylinder. When under pressure in the cylinder, the excess oil is forced out of the cylinder and stored in the reservoir.

Such external oil reservoir suspension system is taught for example in U.S. Pat. Nos. 4,593,921 and 5,486,018. These systems work well. However, due to its bulkiness, such system requires a large amount of space which may not be available for certain types of vehicles such as for example snowmobiles. Moreover, due to the need for the extra reservoir and the conduits necessary for connecting the reservoir to the shock absorber, the cost for such system is much higher and therefore could not be justified in most types of vehicles. Furthermore, due to the extra valves and controls that are required to regulate the flow of fluid between the shock absorber and the reservoir, not only is the cost high, the maintenance for such system likewise is greater than that required for a typical suspension system. Lastly, the chances of a breakdown for such suspension system are increased due to the additional components required.

SUMMARY OF THE INVENTION

The present invention shock absorber uses a combination of different types of fluids for effecting damping. In particular, the present invention shock absorber looks like a conventional shock absorber from the outside but is constructed to have an inner chamber and an outer chamber in concentric relationship with the inner chamber. For example, the outer chamber is constructed to surround at least a portion of the inner chamber. The inner chamber is filled with an incompressible fluid such as for example a hydraulic oil. A number of orifices are provided between the inner chamber and the outer chamber so as to enable fluid communication between the inner and outer chambers. A piston rod extends through an opening at one end of the inner chamber and is coupled or bolted to a piston that fits within the inner chamber in a fluid tight manner so as to separate the inner chamber into two portions. At the portion of the inner chamber where the orifices are located there is provided the incompressible fluid such as for example the hydraulic oil.

Concentrically fitted about the inner chamber is a moveable piston that provides a fluid tight seal within the outer chamber. This piston seal in the outer chamber, like its inner chamber counterpart, also separates the outer chamber into two portions or compartments. The compartment that is in fluid communication with the inner chamber by means of the orifices is likewise filled with hydraulic oil, while the compartment separated from the oil filled compartment is filled with a pressurized gaseous fluid.

By adjusting the pressure of the gas provided in the gas compartment of the outer chamber, a desired stiffness could be obtained for the shock absorber. To further define the stiffness of the shock absorber, the flow rate of the oil between the inner chamber and the outer chamber can be regulated by adjusting the size of the orifices that provide the fluid communicative passage between the inner chamber and the outer chamber. Such adjustment may be made by fitting to at least one of the orifices a conventional needle valve. Thus, the movement of the piston rod relative to the shock absorber cylinder is damped by the hydraulic oil in the inner chamber, the flow rate by which the oil is exchanged between the inner and outer chambers, and the pressurized gas that provides the bias force against the hydraulic oil.

The shock absorber of the present invention is further provided with an air cushion assembly in the form of an elastomeric boot that sealingly covers the portion of the piston rod that extends from the cylinder body. When the elastomeric boot, or bag, is pressurized with the appropriate amount of gaseous fluid such as for example air, an additional damping attribute is provided. To prevent the mounting bracket to which the piston rod is connected from collapsing into the shock absorber cylinder, a spring is fitted about the piston rod between the mounting bracket and the body of the cylinder. An additional spring may be provided about the portion of the piston rod within the inner chamber so as to prevent the rod from collapsing against the opening when the portion of the piston rod within the inner chamber is moved towards the opening.

A second embodiment of the shock absorber of the instant invention has the outer chamber thereof partitioned by a pair of moveable pistons into three separate compartments. The portions of the inner chamber that are separated by the piston connected to the piston rod in turn each have a number of orifices for forming fluid communication passages with their corresponding end compartments of the outer chamber. Thus, as the piston rod is moved by the bumps that the vehicle which the shock absorber is coupled to encounters, the oil in the inner chamber is exchanged with both end compartments of the outer chamber, with one of those end chambers storing the oil forced out of the inner chamber while the other end compartment outputting oil to the inner chamber, to thereby provide a balancing but yet damping influence on the vehicle.

Another embodiment of the shock absorber of the instant invention utilizes particular cavities or bores that coact with plunger mechanisms for providing additional damping attributes to the shock absorber. In particular, a cavity and a bore could be strategically formed in the inner chamber of the housing, and also in the mounting bracket of the shock absorber assembly. Corresponding puncher mechanisms are integrated to the piston of the piston rod and also to the housing so that when the plunger mechanism at the piston coacts or mates with the cavity formed inside the inner chamber, a damping resistance force is built up to act against the movement of the piston, thereby. damping the movement of the piston rod relative to the housing of the shock absorber. Such resistance force adds damping to the shock absorber in the event that the piston rod is being pulled away from the housing of the shock absorber.

In the event that the piston rod and the housing are being pushed toward each other, the bore formed at the mounting bracket will coact with a plunger mechanism formed at the housing so as to generate a resistance force when the plunger mechanism at the housing mates with the bore at the mounting bracket. Again, a resistance force is generated to provide damping for the shock absorber assembly, in this instance when the shock absorber assembly is being compressed.

It is therefore an objective of the present invention to provide a shock absorber that is highly effective in that it uses a number of interacting fluids for defining its stiffness.

It is another objective of the present invention to provide a shock absorber that has an outside appearance that looks substantially like a conventional shock absorber and yet contains therewithin an oil reservoir that prior art shock absorbers do not have.

It is yet a further objective of the present invention to provide a shock absorber that has the damping attributes of a combination air and oil shock isolation system but yet at the same time is structurally small enough to fit into small vehicles such as for example snowmobiles.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein:

FIG. 1 is a side view of the shock absorber of the instant invention;

FIG. 2 is a cross-sectional view of the shock absorber of the instant invention;

DESCRIPTION OF THE PREFERRED EMBODIMENTS

Figure 3:
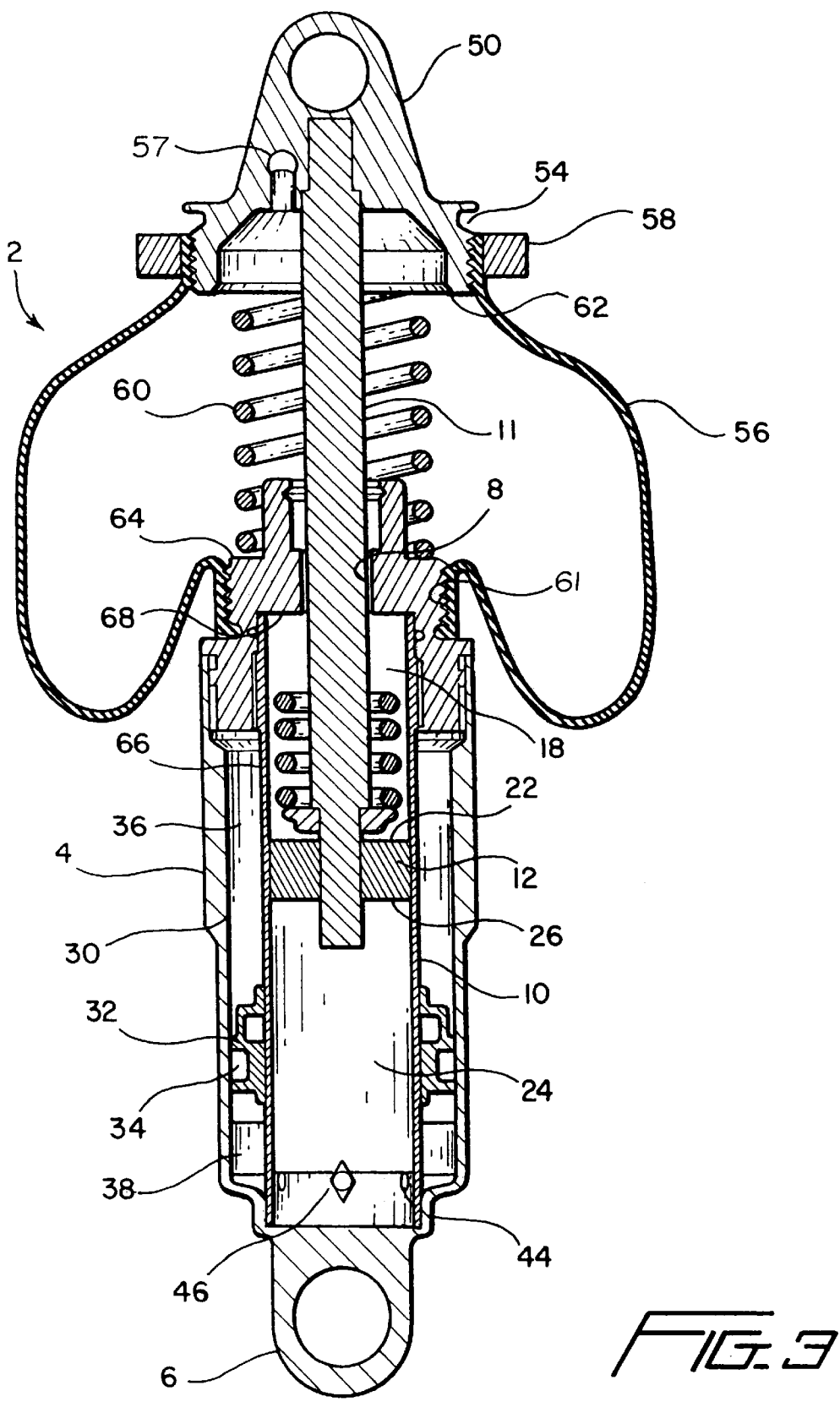
FIG. 3 is another cross-sectional view of the shock absorber of the instant invention equipped with an air spring subassembly.

With reference to FIGS. 1 and 2, a shock absorber 2 of the instant invention is shown to have a main body that comprises a housing 4 having extending therefrom a mounting bracket or anchor means 6. Mounting bracket 6 is meant to be coupled to a first part of a vehicle such as for example the frame thereof. Housing 4 has at its outer end an opening 8 through which a piston rod 11 extends.

As best shown in FIG. 2, housing 4 includes an inner chamber 10 through which a portion of piston rod 11 is moveable. The end of piston rod 11 that resides in inner chamber 10 is coupled, per its end, to a piston 12 that is sealingly fitted within inner chamber 10. Since piston 12 is fixedly mounted to end 14 of piston rod 11, when piston rod 11 moves longitudinally along axis 16 of shock absorber 2, piston 12 likewise moves with it. And since piston 12 sealingly fits within the interior circumferential surface of inner chamber 10, it separates inner chamber 10 into two portions, namely portion 18 that is interposed between the top surface 20 of inner chamber 10 and the upper surface 22 of piston 12, and portion 24 which is interposed between lower surface 26 of piston 12 and the end surface 28 of inner chamber 10.

Inner chamber 10, at least a portion thereof, is shown to be surrounded by an outer chamber 30 in coaxial relationship therewith. For the embodiment shown in FIG. 2, a piston 32 is concentrically mounted about inner chamber 10 within outer chamber 30 and is slidable therealong. With the appropriate sealing gaskets, such as for example 34, piston 32 partitions outer chamber 30 for the FIG. 2 embodiment into two counterparts 36 and 38. O-ring seals 40 and 42 isolate compartment 36 from the environment outside of shock absorber 2.

Returning to inner chamber 10, note that portion 24 thereof has at its lower portion a plurality of orifices 44 each forming a fluid communication passage between portion 24 of inner chamber 10 and compartment 38 of outer chamber 30. A conventional type of valve, for example a needle point valve, designated 46, is fitted to at least one of the orifices so that the flow rate of fluid between portion 24 and compartment 38 can be regulated.

To isolate portion 18 from the environment, a seal 48 is provided at the neck of housing 4 relative to opening 8. As a consequence, even though piston rod 11 is moveable coaxially along axis 16, portion 18 of inner chamber 10 nonetheless is isolated from the outside environment.

The portion of piston rod 11 that extends beyond opening 8 has its end integrated to an anchor means such as for example a mounting bracket 50 that has a bore 52, through which mounting bracket 50 can be bolted to another part of a vehicle by means of a bolt. Bracket 50 has a flange extension 54 whereat an air inlet 56 is provided. The purpose of air inlet 56 will be discussed with reference to FIG. 3.

An incompressible fluid such as for example a hydraulic fluid is provided in inner chamber 10, and specifically in portion 24 thereof. This incompressible fluid likewise is provided in the compartment, namely compartment 38, of outer chamber 30 that is in fluid communication with portion 24, via orifices 44.

For the FIG. 2 embodiment of the instant invention shock absorber, in compartment 36 there is provided another fluid such as for example a pressurized gas. The pressure of the gas provided in compartment 36 can be regulated by means of some valve, not shown, so that a force is continuously being biased against piston 32, which in turn continuously forces the hydraulic oil in compartment 38 into portion 24 of inner chamber 10 by means or orifices 44. And since the hydraulic oil within portion 24 of inner chamber 10 acts against surface 26 of piston 12, a desired stiffness of shock absorber 2 can be obtained by setting the pressure of the gas within compartment 36 to a predetermined amount.

By adjusting the flow rate of the fluid between portion 24 and compartment 38, the stiffness of shock absorber 2 can also be regulated. Thus, the pressure of the gas provided in compartment 36, as well as the size of the opening of each of the orifices 44, can both contribute to defining the stiffness of shock absorber 2.

In operation, when a bump is encountered by the vehicle to which the shock absorber of the instant invention is mounted, a relative movement is effected between piston rod 11 and housing 4. Consequently, assuming that the movement of piston 12 is away from opening 18, then piston 12 would force the hydraulic oil within portion 24 of inner chamber 10 into compartment 38 by way of orifices 44. Note that when additional fluid is forced by the movement of piston 12 from portion 24 into compartment 38, piston 32 within outer chamber 30 is moved in a direction toward the neck of housing 4. The pressurized gas in compartment 36 naturally acts against the movement by piston 32 to thereby damp its movement. The net effect of course is that the ride provided to the driver and passengers, if any, in the vehicle is cushioned.

Another feature of the instant invention is shown in FIG. 3. For this embodiment and the to be discussed embodiment shown in FIG. 4, all components that are the same as those shown in FIGS. 1 and 2 are labeled the same.

Continuing, note that the embodiment of the shock absorber of the instant invention as shown in FIG. 3 comprises an elastomeric tube means, such as for example a rubber boot 56 positioned to cover the portion of piston rod 10 that extends beyond opening 8. Elastomeric tube 56 is fixedly coupled to flange 54 by way of a nut 58 or equivalents thereof. The other end of elastomeric tube 56 is similarly secured to an extension 61 of housing 4, although the nut or equivalents thereof used for securing that end of elastomeric tube 56 to housing 10 is not shown for the sake of simplicity. Since tube 56 is elastomeric, it can expand or contract with the movement of piston rod 11. By way of air inlet 57, a fluid, such as for example air, can be pumped into elastomeric tube 56 under pressure so that the inflated elastomeric tube 56 acts as an air spring to further enhance the shock absorbing ability of shock absorber 2.

To prevent the collapse of piston rod 11 to inner chamber 10, a coil spring 60 is provided about piston rod 11, and interposed between bottom surface 62 of flange 54 and surface 64 of extension 60 of housing 4. With coil spring 60 thus situated, even when the vehicle to which the shock absorber 2 of the instant invention is mounted comes upon a bump suddenly, such sudden shock would not cause piston rod 11 to collapse into housing 10.

For the embodiment shown in FIG. 3, the stiffness of shock absorber 2 is contributed by the hydraulic oil or any other equivalent incompressible fluid in portion 24 of inner chamber 10 and compartment 38 of outer chamber 30, the pressurized gas in compartment 36 of outer chamber 30, and the air cushion provided by the elastomeric bag 56. It should be appreciated that the stiffness can be defined by regulating either the amount or the pressure of any one of those components.

For the FIG. 3 embodiment, a coil spring 66 can be added about piston rod 11 at the portion thereof that is inside of inner chamber 10. Spring 60 further prevents the collapse of piston rod 11 when piston rod 11 is suddenly pulled in a direction away from the closed end of inner chamber 10. With spring 66 in place, piston 12 is prevented from coming into contact with surface 68 of inner chamber 10 even were piston rod 11 to be pulled suddenly away from the closed end of inner chamber 10.

Figure 4:
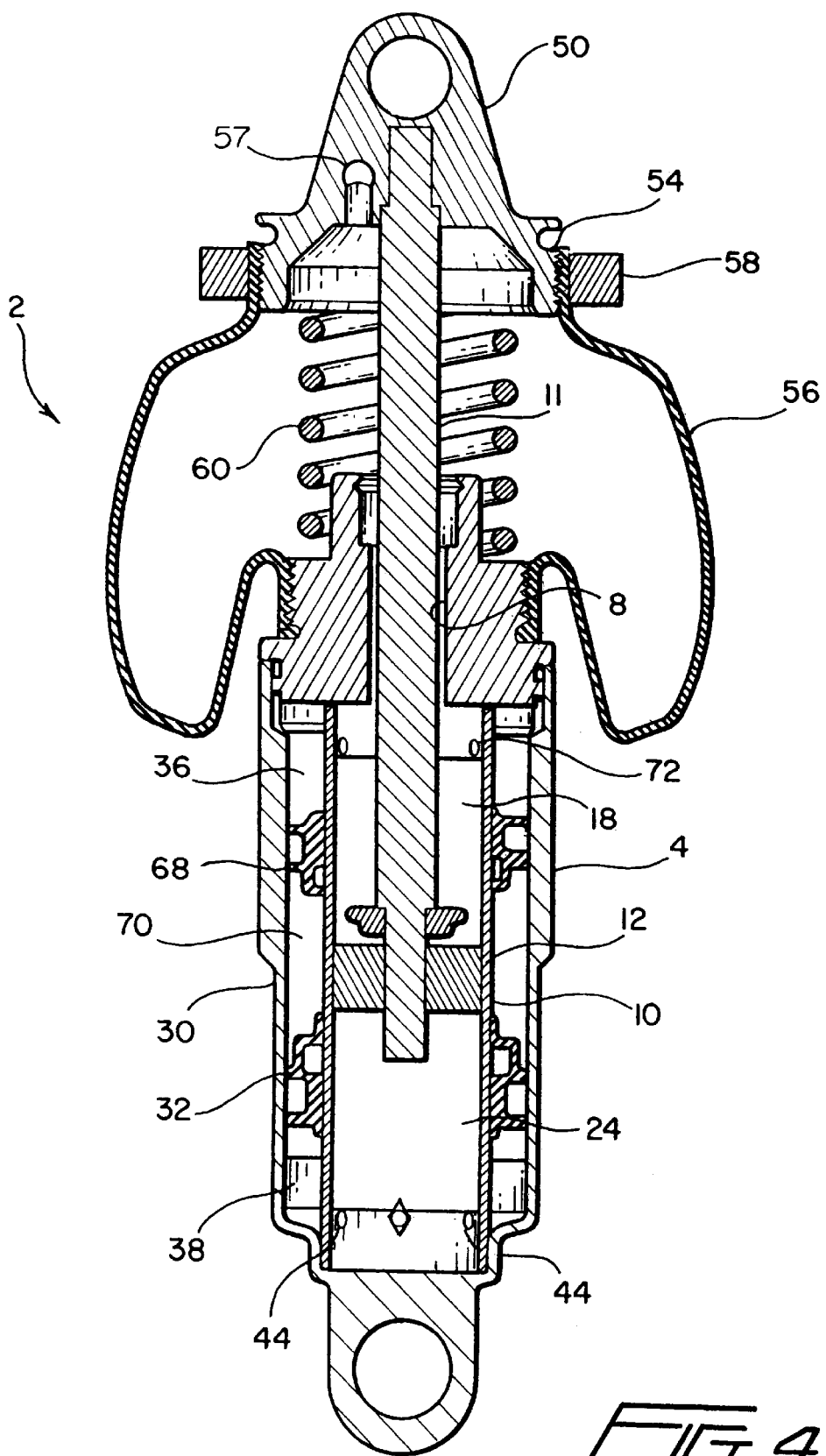
FIG. 4 is a second embodiment of the shock absorber of the instant invention.

FIG. 4 illustrates another embodiment of the instant invention shock absorber. As before, inner chamber 10 is partitioned by piston 12 into 2 portions 18 and 24. But unlike the earlier embodiments, outer chamber 30 now has two circumferential pistons, namely piston 32 and newly added piston 68. Each of pistons 32 and 68 is slidably movable along the length of outer chamber 30, which in turn is divided into three compartments, namely the previous end compartments 36 and 38, as well as a new central or middle compartment 70. For the FIG. 4 embodiment, compartment 36 is filled with an incompressible fluid such as for example a hydraulic oil. Portion 24 of inner chamber 10 likewise is filled with the same incompressible fluid. And orifices 72 which are similar to orifices 44 are introduced to the wall that separates inner chamber 10 and outer chamber 30 so that fluid communication passages are established between portion 24 and compartment 36. For the FIG. 4 embodiment, a pressurized gaseous fluid is provided into central compartment 70 so that biasing forces are asserted against both pistons 32 and 68 toward both ends of housing 4.

In operation, the shock absorber of the FIG. 4 embodiment has the movement of piston rod 11 relative to housing 4 damped by the hydraulic oil in portions 18 and 24. For example, if piston rod 11 were to move towards the closed end of inner chamber 10, the fluid in portion 24 would flow from orifices 44 into compartment 38. At the same time, the fluid in compartment 36 is fed, by means of orifices 72, into portion 18. The sizes of orifices 72 are likewise adjustable so that the flow rate of the fluid between portion 18 and compartment 36 can be regulated.

In the converse scenario, were piston rod 11 to move piston 12 in the direction towards opening 8, then the fluid in portion 18 will be forced into compartment 36 while the fluid in compartment 38 of outer chamber 30 is fed into portion 24 of inner chamber 10. With the configuration provided in the FIG. 4 embodiment, the relative movement between piston rod 11 and housing 4 is readily damped.

For the FIG. 4 embodiment, the factors that contribute to the regulation of the desired stiffness of shock absorber 2 include the amount of pressurized gas in central compartment 70, the flow rate that the respective sets of orifices 44 and 72 set for the exchange of fluid between the two end compartments 36, 38 of outer chamber 30 with the two portions 18, 24 of inner chamber 12, as well as the air cushioning provided by elastomeric boot 56. For the sake of simplicity, spring 66 shown in FIG. 3, which can also be placed around the portion of piston rod 11 within portion 18 of the FIG. 4 embodiment, is not shown in FIG. 4.

Figure 5:
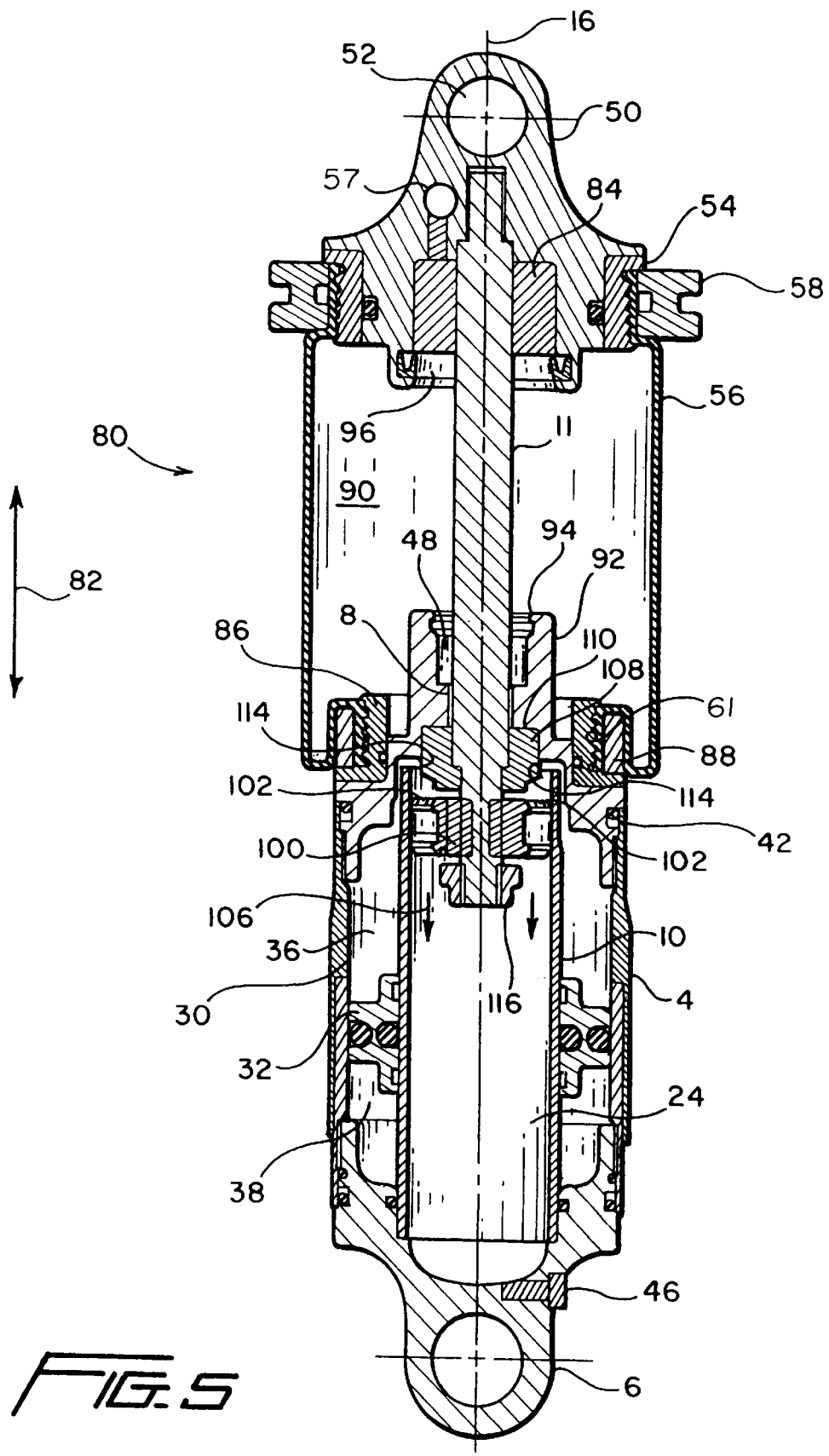
FIG. 5 is a cross-sectional view of an improved embodiment of the shock absorber of the instant invention in the extended position.
Figure 6:
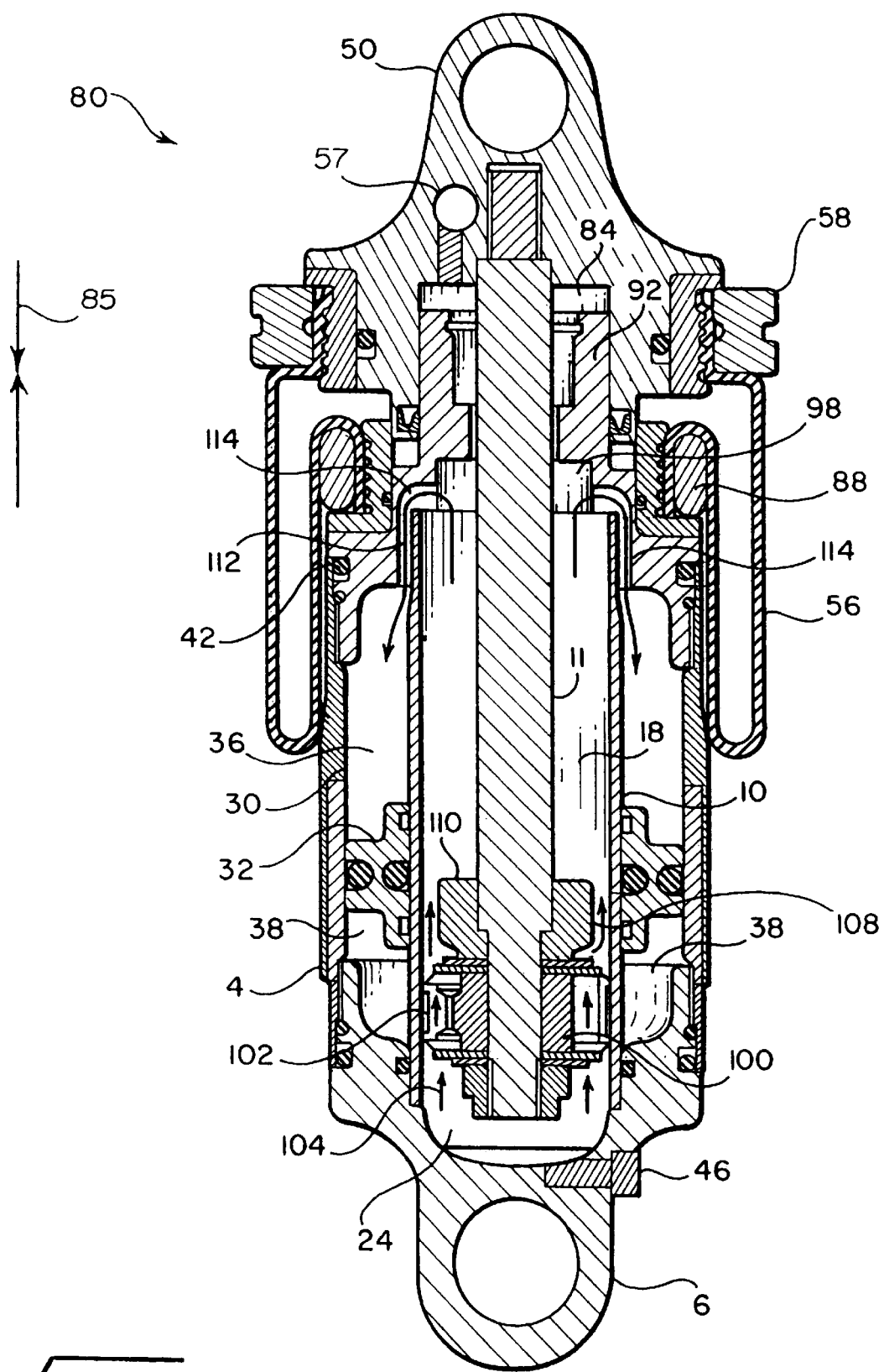
FIG. 6 is a cross-sectional view of the improved embodiment of the shock absorber of the instant invention shown in compression.

Another embodiment of the present invention shock absorber or damping device is shown in the cross-sectional views as illustrated in FIGS. 5 and 6. The same components, or equivalents thereof, for the shock absorber 80 shown in FIGS. 5 and 6 that are the same as those components. As illustrated in FIGS. 1–4 are labeled the same.

FIG. 5 shows shock absorber 80 being in its extended position in which mounting bracket 50 and housing 4 have moved away from each other to their respective most distant positions, as designated by the expansion arrows 82. FIG. 6, on the other hand, per signified by compression arrows 85, illustrates mounting bracket 50 and housing 4 having moved towards each other so as to compress the shock absorber assembly to its most compact configuration. For ease of illustration and understanding, spring 66 shown in FIG. 3 is not shown in either of FIGS. 5 and 6.

For the embodiment of the shock absorber of the present invention as illustrated in FIGS. 5 and 6, there is a bore 84 formed at the side of mounting bracket 50 that faces housing 4. As further shown, an elastomeric tube or boot 56 has one end thereof secured to mounting bracket by means of its flange extension 54 threadedly coacting with a nut 58. The other end of elastic boot 56 is mounted to flange 86 of housing 4, and secured thereto by means of a coacting threaded nut 88. Thus, elastic boot 56 acts as an enclosure means for enclosing the portion of piston rod 11 that extends beyond inner chamber 10 of housing 4. Since elastomeric boot 56 is flexible, a gaseous fluid such as for example air could be input via port 56 to a space 90 that is enclosed by elastomeric boot 56. The gaseous fluid input to space 90 has a predetermined pressure. Note that bore 84 is an extension of space 90.

For the embodiment shown in FIGS. 5 and 6, housing 4 has further extending from the side that opposes mounting bracket 50 an extension 92 that has a dimension that corresponds to the opening of bore 84. Extension 92 could also be considered as an extension of inner chamber 10. In any event, the respective dimensions of bore 84 and extension 92, which acts as a plunger that mates with bore 84, could be varied depending on the amount of resistance force that is desired, when plunger 92 mates with bore 84. This is due to the fact as housing 4 and mounting bracket 50 are moved relatively towards each other, the gaseous fluid in space 90 tends to be compressed so that the pressure in space 90 tends to increase as plunger 92 moves closer and closer towards bore 84.

In fact, by empirical studies, when the front surface 94 of plunger 92 reaches the entrance or mouth 96 of bore 84, the pressure in space 90 becomes equal to the pressure inside bore 84. And as housing 4 and bracket mount 50 continue to move towards each other so that plunger 92 continues to advance into bore 84, a correspondingly increasing pressure is built up inside bore 84, so that a proportionally greater resistive force acts against plunger 92 to thereby enable shock absorber 80 to provide an ever increasing cushioning effect for the vehicle to which shock absorber 80 is mounted. Such compressive damping is due to the fact that the space in bore 84 becomes ever decreasing due to the advancement of plunger 92.

As best shown in FIG. 6, the embodiment of the damping device shown in FIGS. 5 and 6 has a cavity 98 that is formed as an extension of inner chamber 10. Further, piston 100 of shock absorber 80 of FIGS. 5 and 6, unlike piston 12 of the earlier embodiments, is configured to have at least one passage 102 extending therethrough so as to effect a fluid communication path between portion 18 and portion 24 of inner chamber 10. Thus, when inner chamber 10 is filled with a fluid such as for example an incompressible hydraulic oil, when shock absorber 80 is in its compressive mode, as shown per FIG. 6, the fluid in portion 24 will pass through passage 102 to portion 18, per shown by directional arrows 104.

On the other hand, in the expanding mode as shown in FIG. 5, the fluid in portion 18 will flow through passage 102 to portion 24 of inner chamber 10, per shown by directional arrow 106. By adjusting the diameter of passage 102, the speed with which piston 100 traverses along inner chamber 10 could be regulated, as the amount of fluid that flows through passage 102 in inner chamber 10 relates to the amount of damping the fluid has on the movement of piston 100.

Piston 100 has mounted thereto or extending therefrom a member 108 that acts as yet another plunger for the embodiment of the shock absorber of the present invention as shown in FIGS. 5 and 6. Plunger 108 has a dimension that is configured to correspond with the opening of cavity 98 that faces it so that plunger 108 could readily mate with cavity 98.

Similar to the coaction between plunger 92 and bore 84, when bracket mount 50 and housing 4 are moved relatively away from each other, plunger 108 extending from piston 100 is moved by piston rod 11 towards cavity 98. Again, by empirical studies and calculation, by the time that face 110 of plunger 108 reaches substantially the mouth 112 of cavity 98, the pressure of the fluid in inner chamber 10 and the pressure of the fluid remaining in cavity 98 are substantially equaled. Note that as plunger 108 and cavity 98 are further moved relatively towards each other, the fluid in inner chamber 10 tends to flow from portion 18 to portion 24, as indicated by directional arrows 106 shown in FIG. 5. Moreover, the fluid also tends to flow from portion 18 to compartment 36 of outer chamber 30 via passages 114.

And as plunger 108 further advances into cavity 98, the openings to passages 114 are covered by the side wall of plunger 108. Accordingly, the pressure of the fluid inside cavity 98 increases in proportion to the distance that plunger 108 has advanced into cavity 98. This increasing resistive pressure therefore provides damping against the movement of plunger 108, and therefore the movement of piston 100 and of course the movement of piston rod 11. As a consequence, a cushioning effect is provided to the vehicle to which shock absorber 80 is mounted when shock absorber 80 is in the expanding mode as shown in FIG. 5.

Although the embodiment shown in FIGS. 5 and 6 provides for the coaction of plunger 92 with bore 84, both of which are outside inner chamber 10, it should be appreciated that additional cavities similar to cavity 98 could be formed at the other side of inner chamber 10, such as for example at the bottom of inner chamber 10 as shown in FIG. 5. Similarly, an additional plunger could be added to piston 100 in place of the nut 116 that secures piston 100 to piston rod 11. Thus, instead of plunger 92 coating with bore 84 in the compressing mode as shown in FIG. 6, the additional plunger added to piston rod 11 could coact with the additional cavity that is formed at the bottom of inner chamber 10 to provide damping for shock absorber 80 as discussed above with respect to plunger 92 and bore 84. Of course, in place of only the replacement plunger and cavity, plunger 92 and bore 84 could continue to coact with each other in conjunction with the additional pair of plunger and cavity in inner chamber 10 so as to provide even more damping for shock absorber 80. The amount of damping in turn could further be regulated by varying the dimension of the respective sets of plunger/bore and/or plunger/cavity.

Similar to the embodiments of the present invention as shown in FIGS. 1–4, the embodiment of the shock absorber shown in FIGS. 5 and 6 also has a separator piston 32 that partitions outer chamber 30 into at least two compartments, namely compartment 36 and compartment 38 as shown. As discussed above, inner chamber 10 and outer compartment 36 are filled with a fluid such as for example incompressible hydraulic oil. To provide additional damping, a gaseous fluid under pressure is input to compartment 38. The pressurized air in compartment 38 tends to react against the hydraulic oil in compartment 36, and therefore inner chamber 10. Of course, instead of the hydraulic oil filling inner chamber 10 and compartment 36 and a pressurized gas filling compartment 38, the reverse is also applicable in that inner chamber 10 and compartment 36 could instead be filled with a pressurized gas while compartment 38 is filled with the incompressible hydraulic oil.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the hereto appended claims.

What is claimed is:

1. A shock absorber, comprising:

a housing having an inner chamber and an outer chamber, said inner chamber having an opening at one end thereof;

a rod positioned relative to and slidably movable through said opening having one end movable longitudinally along at least one portion of said inner chamber and an other end extending beyond said opening;

a mount member having a bore through which said other end of said rod is fixedly coupled;

piston means coupled to said one end of said rod so as to be moveable in unison with said rod inside said inner chamber, said piston means having a plunger means;

at least one cavity at one end of said inner chamber to which said plunger means is matable with when said mount member and said housing are moved away from each other;

flexible enclosure means having one end fixedly coupled to said mount member and another end fixedly coupled to said housing for enclosing the portion of said rod extending beyond said opening, a gaseous fluid being introduced under pressure into said enclosure means;

wherein, once said enclosure means is inflated with the gaseous fluid to a given pressure, said enclosure means in combination with the pressurized gaseous fluid stored therein contribute to the stiffness characteristics of said shock absorber;

an other plunger means extending from said housing towards said mount member and guided in its movement by said rod;

wherein the pressure of the gaseous fluid in said elastomeric enclosure means has a given pressure, the pressure of the gaseous fluid in side said elastomeric enclosure means being substantially equaled to the pressure of the gaseous fluid in said bore when said other plunger means is positioned substantially at the entrance of said bore, the pressure of the gaseous fluid in said bore increases in proportion to the distance said other plunger means advances inside said bore to thereby provide damping for said shock absorber.

2. Shock absorber of claim 1, further comprising:

a fluid filling said inner chamber;

wherein the pressure of the fluid in said cavity and the pressure of the fluid in said inner chamber are substantially equaled when said plunger means is positioned substantially at the mouth of said cavity; and wherein the pressure of the fluid in said cavity increases in proportion to the distance said plunger means advances inside said cavity.

3. Shock absorber of claim 2, further comprising:

at least one orifice connecting said inner chamber and said outer chamber so as to enable fluid communication between said chambers, the fluid in said cavity being compressed by and forced out through said orifice to said outer chamber by said plunger means mating with said cavity;

wherein the increased pressure of the fluid in said cavity resulting from being compressed by said plunger means acts to damp the movement of said piston means to thereby provide damping for said shock absorber.

4. Shock absorber of claim 3, wherein the amount of damping for said shock absorber can be varied by adjusting at least the dimension of said orifice, or the respective dimensions of said cavity and said plunger means.

5. Shock absorber of claim 1, further comprising:

an other plunger means extending from said housing towards said mount member, the movement of said other plunger means being guided by said rod, said other plunger means matable with said bore when said other plunger means and said mount member are moved towards each other.

6. Shock absorber of claim 1, further comprising:

a fluid stored in said inner chamber; and wherein said piston means includes at least one passage for allowing the fluid to flow through said piston means, the dimension of said passage being adjustable for restricting the amount of fluid passing through said piston means to thereby provide selective resistance to the movement of said piston means in said inner chamber.

7. Shock absorber of claim 1, further comprising:

separator means movable along said outer chamber for partitioning said outer chamber into at least two compartments;

at least one orifice connecting said inner chamber and one of said compartments of said outer chamber to allow fluid communication therebetween;

one fluid stored in said inner chamber and said one compartment;

an other fluid stored in the other of said compartments, said other fluid being pressurized to resist said one fluid from being forced into said one compartment from said inner chamber.

8. Shock absorber of claim 7, wherein one of said one and other fluids comprises gas while the other of said one and other fluids comprises hydraulic oil.

9. Shock absorber of claim 1, wherein the amount of damping for said shock absorber can be varied by adjusting the respective dimensions of said bore and said other plunger means.

10. Shock absorber of claim 1, wherein said outer chamber is in concentric relationship with respect to said inner chamber.

11. Shock absorber of claim 1, wherein said housing is coupled to one part of a vehicle and said mount member is coupled to another part of said vehicle, the ride of said vehicle being cushioned by the damped relative movement between said rod and said housing.

12. A shock absorber, comprising:

a housing having one chamber and an other chamber external of said one chamber, said one chamber having an opening at one end thereof;

a rod positioned relative to and movable through said opening having one end movable longitudinally along at least one portion of said one chamber and an other end extending beyond said opening;

a mount member to which said other end of said rod is fixedly coupled, a bore being formed in said mount member, said mount member being movable relative to said housing; and plunger means extending from said housing towards said mount member, said plunger means mating with said bore when said plunger means and said mount member are moved relatively toward each other.

13. Shock absorber of claim 12, further comprising:

piston means coupled to said one end of said rod so as to be slidably moveable in unison with said rod;

an other plunger means extending from said piston means; and at least one cavity at one end of said one chamber to which said other plunger means mates when said rod is moved so as to guide said piston means towards the end of said one chamber where said cavity is.

14. Shock absorber of claim 13, further comprising:

a fluid filling said one chamber;

wherein the pressure of the fluid in said cavity and the pressure of the fluid in said one chamber are substantially equaled when said other plunger means is substantially at the mouth of said cavity; and wherein the pressure of the fluid in said cavity increases in proportion to the distance said other plunger means advances inside said cavity.

15. Shock absorber of claim 14, further comprising:

at least one orifice connecting said one chamber and said other chamber to enable fluid communication between said chambers, the fluid in said cavity being compressed by and forced out through said orifice to said other chamber by said other plunger means mating with said cavity;

wherein the increased pressure of the fluid in said cavity resulting from being compressed by said other plunger means acts to damp the movement of said piston means to thereby provide damping for said shock absorber.

16. Shock absorber of claim 15, wherein the amount of damping for said shock absorber can be varied by adjusting at least one of the following: the dimension of said orifice, the respective dimensions of said bore and said plunger means, and the respective dimensions of said cavity and said other plunger means.

17. Shock absorber of claim 14, further comprising:

separator means movable along said other chamber for partitioning said other chamber into at least two compartments;

at least one orifice connecting said one chamber and one of said compartments of said other chamber to allow fluid communication therebetween;

one fluid stored in said one chamber and said one compartment;

an other fluid stored in the other of said compartments, said other fluid being pressurized to resist said one fluid from being forced into said one compartment from said inner chamber.

18. Shock absorber of claim 17, wherein one of said one and other fluids comprises a gas and the other of said one and other fluids comprises a hydraulic oil.

19. Shock absorber of claim 13, further comprising:

a fluid stored in said one chamber; and wherein said piston means includes at least one passage for allowing the fluid to flow therethrough, the dimension of said passage being adjustable for restricting the amount of fluid passing through said piston means to thereby provide selective resistance to the movement of said piston means in said one chamber.

20. Shock absorber of claim 13, further comprising:

flexible enclosure means having one end fixedly coupled to said mount member and another end fixedly coupled to said housing for covering the portion of said rod extending beyond said opening, a gaseous fluid being introduced under pressure into said enclosure means;

wherein, once said enclosure means is inflated to a given pressure, said enclosure means in combination with the pressurized gaseous fluid stored therein contribute to the stiffness characteristics of said shock absorber.

21. Shock absorber of claim 20, wherein the pressure of the gaseous fluid in said enclosure means has a given pressure, the pressure of the gaseous fluid inside said enclosure means being substantially equaled to the pressure of the gaseous fluid in said bore when said plunger means is positioned substantially at the entrance of said bore, the pressure of the gaseous fluid in said bore increases in proportion to the distance said plunger means advances inside said bore to thereby provide damping for said shock absorber.

22. A damping device, comprising:

a housing having one chamber and an other chamber external of said one chamber, said one chamber having an opening at one end thereof, said one and other chambers being in fluid communication with each other;

separator means movable in said other chamber for partitioning said other chamber into at least two compartments;

a rod positioned relative to and movable through said opening having one end movable longitudinally along at least one portion of said one chamber and an other end extending beyond said opening;

a mount member connected to said other end of said rod;

a bore formed in said mount member facing said housing;

piston means mounted about said rod and movable in unison therewith in said one chamber;

one plunger means extending from said housing opposed to said bore, said one plunger means mating with said bore when said housing and said mount member are moved relatively towards each other; and a first fluid stored in said one chamber and one of said two compartments, said first fluid offering resistance to the movement of said piston means;

wherein the pressure of said first fluid in said cavity increases in proportion to the distance said plunger means advances into said cavity to thereby correspondingly increase the resistance against the movement of said piston means.

23. Damping device of claim 22, further comprising:

a second fluid stored in the other of said compartments, said second fluid exerting a given pressure against said first fluid to enhance the resistance said first fluid exerts against the movement of said piston means.

24. Damping device of claim 22, further comprising:

flexible enclosure means for enveloping said other end of said rod; and a gaseous fluid being introduced under pressure into said enclosure means;

wherein said enclosure means in combination with the pressurized gaseous fluid stored therein contribute to the stiffness characteristics of said damping device.

25. Damping device of claim 24, wherein the pressure of the gaseous fluid in said enclosure means has a given pressure, the pressure of the gaseous fluid inside said enclosure means being substantially equaled to the pressure of the gaseous fluid in said bore when other plunger means is positioned substantially at the entrance of said bore, the pressure of the gaseous fluid in said bore increases in proportion to the distance said other plunger means advances inside said bore to thereby provide damping for said damping device.

26. Damping device of claim 22, wherein said piston means includes at least one passage for allowing said first fluid to flow therethrough, the dimension of said passage being adjustable for restricting the amount of fluid passing through said piston means to thereby provide selective resistance to the movement of said piston means in said one chamber.

27. Damping device of claim 22, further comprising:
   other plunger means extending from said piston means; and
   at least one cavity at one end of said one chamber for mating with said other plunger means when said mount member and said housing are moved away from each other.

28. Damping device of claim 27, wherein said cavity is at the end of said one chamber having said opening, the movement of said piston means being damped when said rod and said housing are being moved relatively away from each other as said other plunger means mates with said cavity.

29. Damping device of claim 27, wherein the amount of damping for said damping device can be varied by adjusting at least the respective dimensions of said cavity and said other plunger means, or the respective dimensions of said bore and said one plunger means.

* * * * *